United States Patent
Baude et al.

[11] Patent Number: 6,145,987
[45] Date of Patent: Nov. 14, 2000

[54] MULTIFOCAL OPHTHALMIC LENSES WITH SPHERICAL ABERRATION VARYING WITH THE ADDITION AND THE AMETROPIA

[75] Inventors: Dominique Baude, St Ouen; Nicolas Chateau, Paris, both of France

[73] Assignee: Essilor International Compagnie Generale d'Optique, Charenton le Pont, France

[21] Appl. No.: 09/212,956

[22] Filed: Dec. 16, 1998

[30] Foreign Application Priority Data

Dec. 16, 1997 [FR] France .................................. 97 15927

[51] Int. Cl.⁷ ...................................................... G02C 7/06
[52] U.S. Cl. ............................................. 351/169; 351/177
[58] Field of Search ........................................ 351/168, 169, 351/170, 171, 172, 177

[56] References Cited

U.S. PATENT DOCUMENTS 4,976,534 12/1990 Miege .................................... 351/161
5,699,141 12/1997 Monteil ................................. 351/161

FOREIGN PATENT DOCUMENTS

| 0381567 | 8/1990 | European Pat. Off. . |
| 2737312 | 1/1997 | France . |
| WO9423327 | 10/1994 | WIPO . |

*Primary Examiner*—Scott J. Sugarman
*Attorney, Agent, or Firm*—Young & Thompson

[57] ABSTRACT

A multifocal ophthalmic lens is disclosed. The power profile (P) of the lens as a function of the height (h) above the axis (A) of the lens and the addition (Add) corresponding to the degree of presbyopia of the wearer is defined by an equation of the form:

$$P(h)=f(P_{VL}, \text{Add}, h)+C(\text{Add}, P_{VL})h^2+B(\text{Add}, P_{VL})$$

in which $P_{VL}$ is the power required for far vision, $f$ is a function of evolution between the near vision and far vision powers, $C(\text{Add}, P_{VL})$ is a spherical aberration correction coefficient depending on the addition and on the far vision power and $B(\text{Add}, P_{VL})$ is a power correction coefficient depending on the spherical aberration coefficient.

14 Claims, 7 Drawing Sheets

MULTIFOCAL OPHTHALMIC LENSES WITH SPHERICAL ABERRATION VARYING WITH THE ADDITION AND THE AMETROPIA

BACKGROUND OF THE INVENTION

1. Field of the invention

The invention concerns a contact lens with spherical aberration correction for presbyopia.

2. Description of the prior art

The spherical aberration of a lens (whether that of the human eye or a contact lens placed on the cornea) is generally characterized in that the position of the point of intersection of the emerging ray and the optical axis of the lens depends on the height $\underline{h}$ at which the incident ray passes through said lens. A patch is then obtained on the retina rather than a point image. This reduces the discrimination of two points at a great distance. This reduces visual performance which causes visual discomfort.

Physiological studies show that the spherical aberration of the human eye increases with age.

U.S. Pat. No. 3,778,937 ("Method for making aspheric surfaces" Neefe, Nov. 1, 1971), describes a method of selectively abrading a portion of the outside face of a unifocal contact lens to confer on it a spherical surface which can correct the spherical aberration of the eye.

U.S. Pat. No. 4,564,484 ("Production of soft lenses having reduced spherical aberrations", Neefe, Nov. 26, 1984), granted to the same inventor, discloses a method of fabrication characterized by the production of unifocal lenses whose outside face is initially a spherical dome and whose inside face is shaped to have a radius of curvature that is progressively reduced toward the edge of the lens. When the lens is placed on the eye its internal face espouses the spherical contour of the cornea and it therefore has a radius of curvature of the outside face that progressively increases toward the edge of the lens, which enables correction of spherical aberration.

In the particular case of persons suffering from presbyopia, different corrections are required in concentric areas within the pupil. Bifocal or multifocal lenses having a plurality of separate correction areas are conventionally used to correct presbyopia. They generally have a discontinuity of power between the different correction areas corresponding to near and far vision.

Application FR 89 01417 ("Lentille optique à vision simultanée pour la correction de la presbytie" ["Simultaneous vision optical lens for correcting presbyopia"], Essilor, Feb. 3, 1989), publication number 2 642 854, describes a progressive simultaneous vision optical lens for correcting presbyopia defined by the curve representing its power as a function of the height relative to the axis. This curve is inscribed within an area contained between a lower envelope curve and an upper envelope curve which satisfy polynomial equations determined for this purpose and define two separate vision areas, one corresponding to far vision and the other corresponding to near vision. In practice there are one or more continuous intermediate vision areas between the far and near vision areas.

The skilled person can determine the surfaces to be imparted to the inside and outside faces of the optical lens from a polynomial equation so that it satisfies the corresponding power conditions.

As specified in the above French patent, to which reference may usefully be made, the term sagittal power is used to denote the reciprocal, in diopters, of the distance in meters measured from the main plane of the optical lens at which any light ray parallel to the optical axis of the lens and at a height $\underline{h}$ above the axis intersects the axis after passing through the optical lens.

The lens for correcting then has two main areas, one of which corresponds to near vision and the other to far vision, these areas being concentric and linked by an area of continuous evolution. In practice the near vision power is deduced from the far vision power by adding a particular "addition" characteristic of the presbyopia to be corrected.

In French patent 93 01831, publication number 2 701 770 ("Lentille ophtalmique à vision simultanée pour la correction de la presbytie et jeux de deux telles lentilles ophtalmiques pour un même porteur" ["Simultaneous vision ophthalmic lens for correcting presbyopia and set of two such ophthalmic lenses for the same wearer"], Essilor, Feb. 18, 1993), there are particular provisions to give preference to either the far or near vision area over the other, on the basis of lenses of the kind in which the power curve is between two polynomial envelopes.

In a particular case of weak presbyopia, characterized by a low value of the addition (less than 1.5 diopters), French patent 95 09016 ("Lentille optique à vision simultanée progressive pour la correction d'une presbytie correspondant à une faible addition" ["Progressive simultaneous vision optical lens for correcting presbyopia corresponding to a low addition"], Essilor, Jul. 25, 1995) proposes a lens of the kind in which the power curve is between two polynomial envelopes and in which the intermediate area between the near vision and far vision areas is such that the near vision area is relatively large compared to lenses with a high addition.

The problem of correcting spherical aberration, touched on above, is naturally more acute for persons suffering from presbyopia or wearing lenses with a high correcting power.

The article by T. C. A. Jenkins, "Aberrations of the eye and their effects on vision", published in the British Journal of Physiological Optics 20 p. 59–91, 1963 shows that the spherical aberration of the eye varies with age.

PCT application WO 94/23327 ("Contact lens designed to accommodate and correct for the effects of presbyopia", Pilkington Mar. 22, 1994) describes a type of lens for correcting presbyopia including two concentric areas, the central, "direct" vision area being corrected for spherical aberration by a parabolic or hyperbolic internal shape (before fitting to the eye) and the peripheral area, applying a correction different to that of the central area and corresponding to "indirect" vision, having a spherical surface.

The invention is directed to a progressive multifocal ophthalmic lens, the design of which allows for the evolution of ocular spherical aberration with age and for its relation to ametropia.

SUMMARY OF THE INVENTION

To this end the invention proposes a multifocal ophthalmic lens in which the power profile (P) in diopters of the lens as a function of the height (h) in mm above the axis of the lens and the addition (Add) corresponding to the degree of presbyopia of the wearer is defined by an equation of the form:

$$P(h)=f(P_{VL}, Add, h)+C(Add, P_{VL})h^2+B(Add, P_{VL})$$

in which $P_{VL}$ is the power in diopters required for far vision, $\underline{f}$ is a function of evolution between the near vision and far vision powers, $C(Add, P_{VL})$ is a spherical aberration correction coefficient depending on the addition and on the far vision power and $B(Add, P_{VL})$ is a power correction coefficient depending on the spherical aberration coefficient.

In a first case, the evolution function $\underline{f}$ between near vision and far vision is between lower and upper envelope curves of polynomial form:

$$fmin(P_{VL}, Add, h) = \sum_{i=0}^{9} A'_{2i} h^{2i} + P_{VL}$$

$$fmax(P_{VL}, Add, h) = \sum_{i=0}^{9} A''_{2i} h^{2i} + P_{VL}$$

in which the coefficients $A'_{2i}$ and $A''_{2i}$ are characteristics of the power evolution profile of the lens.

The function $\underline{f}$ of evolution between near vision and far vision is preferably of polynomial form:

$$f(P_{VL}, Add, h) = \sum_{i=0}^{9} A_{2i} h^{2i} + P_{VL}$$

in which the coefficients $A_{2i}$ are characteristics of the power evolution profile of the lens and depend on the addition Add.

The invention is aimed in particular at certain families of lenses defined by sets of coefficients $A_{2i}$ or $A'_{2i}$ and $A''_{2i}$ according to the addition of the lens. These are either progressive vision lenses of the kind defined in French patent 89 01417 or 95 09016 (for weak additions) or progressive vision lenses strengthened for near vision or for far vision (of the kind defined in French patent 93 01831), with coefficients $A_{2i}$ or $A'_{2i}$ and $A''_{2i}$ different from those of the cited patents.

In a second case, the function $\underline{f}$ of evolution between near vision and far vision is of discontinuous form with at least two segments as a function of $\underline{h}$:

$f(P_{VL}, Add, h) = P_{VL} + Add$ for $h \leq R$ and $f(P_{VL}, Add, h) = P_{VL}$ for $h > R$ where R is an internal area radius of the lens depending on the addition.

The invention is directed in particular to a family of such lenses defined by a particular function of the evolution of the radius of the far vision area in accordance with the addition of the lens.

The coefficient C is advantageously within an area defined by the following lower and upper curves:

$Cmin(Add, P_{VL}) = -0.098\ Add + 0.02\ P_{VL} - 0.15$ $Cmax(Add, P_{VL}) = -0.0047\ Add + 0.02\ P_{VL} - 0.0065$ where $P_{VL}$ is in the range $-20$ diopters to $+20$ diopters and Add is in the range 0.50 diopters to 4 diopters, C being expressed in diopters/mm².

The coefficient C preferably is substantially defined by the following equation:

$C(Add, P_{VL}) = -0.051\ Add + 0.02\ P_{VL} - 0.077$

The power correction coefficient (B) is preferably expressed as a function of the spherical aberration correction coefficient (C) substantially by the following equation:

When $C \neq 0$, $$B(Add, P_{VL}) = -0.46 \cdot \frac{C(Add, P_{VL})}{|C(Add, P_{VL})|} [1 - \exp(-13.1 \cdot |C(Add, P_{VL})|)]$$

When $C=0$, $B(Add, P_{VL})=0$.

The description and the drawings of a preferred embodiment of the invention given below will explain the aims and advantages of the invention. The description is clearly given by way of example only and is not limiting on the invention.

DETAILED DESCRIPTION OF THE PREFERRED EMBODIMENTS

Figure 1:
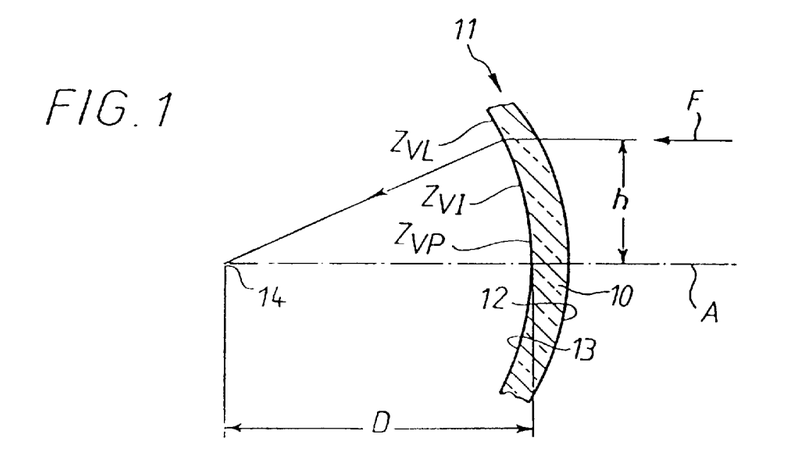
FIG. 1 is a partial view in axial section of an optical lens.

FIG. 1 shows an ophthalmic lens 11 for presbyopia in section. The central area 10 corresponds to the active optical area of the lens, which generally extends over a disk with a radius in the range 2 mm to 3 mm. The active area is naturally limited by the size of the pupil, the external area of the lens facilitating placement on the eye but having no image creation function, because the light rays that pass through this area do not reach the retina. The power profile of the lens of the invention is preferably defined for values for $\underline{h}$ in the range 0.5 mm to 3 mm.

A light ray F parallel to the axis A of the lens and passing through the lens at a height $\underline{h}$ above the axis is deflected toward the axis and intersects it at a point 14 at a distance D after passing through the lens.

The sagittal power of the lens is defined by the reciprocal of this distance, expressed in meters. If the rays do not converge on the same point 14, according to their incident height $\underline{h}$, the power depends on that height.

Figure 2:
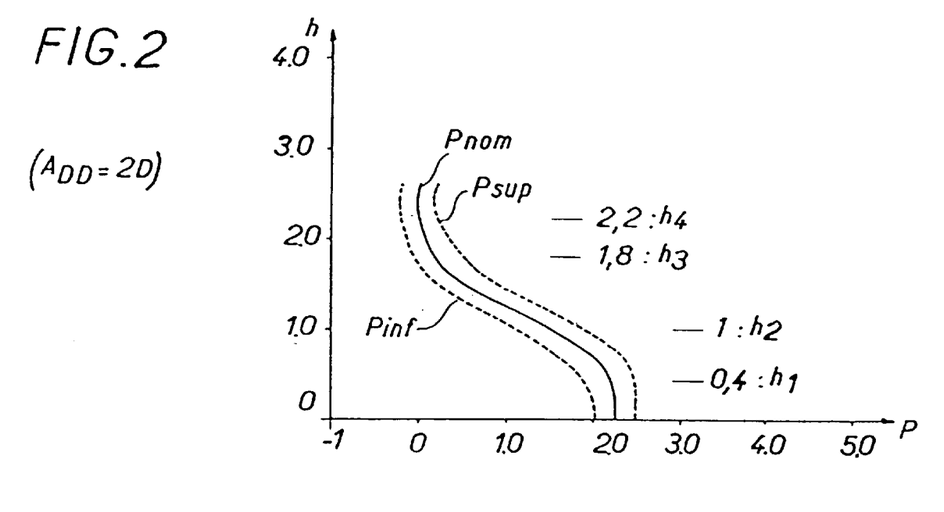
FIG. 2 shows an example of a standard diagram of the power of a progressive multifocal optical lens without spherical aberration correction for an addition of 2 diopters.

In a progressive multifocal lens, the nominal power profile $P_{NOM}$, as a function of the height h above the axis A, is a continuous curve, one example of which is shown in FIG. 2.

As already mentioned, in French patent applications 89 01417, 93 01831 and 95 09016 the power profile of the lens is defined by two envelope curves $P_{INF}$ and $P_{SUP}$ representing the lower and upper curves between which the profile must be located to be deemed to conform to specifications matching the wearer.

In one particular family of progressive multifocal lenses, the function $\underline{f}$ of nominal evolution between near vision and far vision is of polynomial form:

$$f(P_{VL}, Add, h) = \sum_{i=0}^{9} A_{2i} h^{2i} + P_{VL}$$

in which the coefficients $A_{2i}$ are characteristics of the power evolution profile of the lens. The lower and upper envelope curves are also of polynomial form:

$$fmin(P_{VL}, Add, h) = \sum_{i=0}^{9} A'_{2i} h^{2i} + P_{VL}$$

$$fmax(P_{VL}, Add, h) = \sum_{i=0}^{9} A''_{2i} h^{2i} + P_{VL}$$

in which the coefficients $A'_{2i}$ and $A''_{2i}$ are characteristics of the power evolution profile of the lens.

Tables T1 through T3 give the coefficients corresponding to particular families of lenses, for standard corrections or for lenses of weak addition or for lenses, strengthened near vision or far vision. The coefficients are given for powers in diopters and heights in millimeters.

The values corresponding to intermediate additions or beyond the above values are clearly obtained by interpolation or extrapolation from these curves.

In a bifocal lens the power profile is discontinuous, with two separate areas such that the radius (R) of the boundary between the areas depends on the addition of the lens. The function $f$ of evolution between near vision and far vision is discontinuous with at least two segments as a function of $h$:

$f(P_{VL}, Add, h) = P_{VL} + Add$ for $h \leq R$ and $f(P_{VL}, Add, h) = P_{VL}$ for $h > R$ where R is an internal area radius of the lens, depending on the addition.

The radius R in millimeters preferably has substantially the following values as a function of the addition (Add) in diopters:

| | |
|---|---|
| for Add = 0.5 | R = 1.39 |
| for Add = 0.75 | R = 1.35 |
| for Add = 1 | R = 1.32 |
| for Add = 1.25 | R = 1.29 |
| for Add = 1.5 | R = 1.27 |
| for Add = 1.75 | R = 1.245 |
| for Add = 2 | R = 1.225 |
| for Add = 2.25 | R = 1.2 |
| for Add = 2.5 | R = 1.17 |
| for Add = 2.75 | R = 1.12 |
| for Add = 3 | R = 1.06 |

Figure 3:
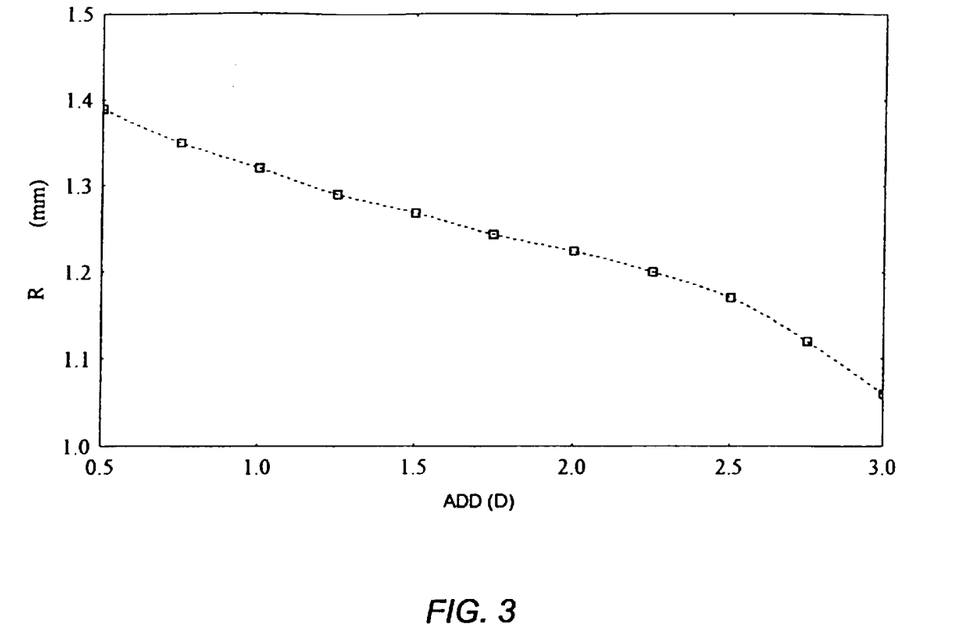
FIG. 3 shows the optimal radius of the near vision area as a function of the addition for a bifocal lens.

(R is advantageously within a range of ±0.15 mm about the nominal values indicated), and the radius R for the other values of the addition (Add) is obtained by interpolation or extrapolation. FIG. 3 shows the curve representing the radius R as a function of the addition Add of the lens.

The power profile of the lens of the invention is obtained by adding to the power profile (P) of the lens, as defined above for the various families of lenses concerned, a third order spherical aberration term: $C(Add, P_{VL}) h^2$.

The variations in the coefficient C as a function of the addition Add and of the far vision power $P_{VL}$ are defined by an optimal curve and by envelope curves representing the upper and lower tolerances on the values of the coefficient. The optimal curve is defined by the following equation:

$C(Add, P_{VL}) = -0.051\, Add + 0.02\, P_{VL} - 0.077$ and the envelope curves by the two equations:

$Cmin(Add, P_{VL}) = -0.098\, Add + 0.02\, P_{VL} - 0.15$ $Cmax(Add, P_{VL}) = -0.0047\, Add + 0.02\, P_{VL} - 0.0065$ with Add and $P_{VL}$ n diopters and C in diopters/mm$^2$.

The above equations are valid for far vision power values in the range −20 diopters to +20 diopters and for values of the addition Add in the range 0.50 diopters to 4 diopters.

Adding the spherical aberration correction coefficient C modifies the effective far vision power of the lens slightly, to a value $P_{VL} + \Delta P$. To revert to the initial value of the power for this profile it is necessary to add a power correction term B which depends on the addition and on the power, by means of the coefficient $C(Add, P_{VL})$.

The power correction coefficient, defined in diopters, is then expressed as follows:

When $C \neq 0$, $$B(Add, P_{VL}) = -0.46 \cdot \frac{C(Add, P_{VL})}{|C(Add, P_{VL})|} [1 - \exp(-13.1 \cdot |C(Add, P_{VL})|)]$$

When $C = 0$, $B(Add, P_{VL}) = 0$.

Clearly an expression that is a direct function of Add and $P_{VL}$ can be deduced from the above equation, by replacing the spherical aberration coefficient $C(Add, P_{VL})$ by its expression as a function of the addition Add and the far vision power $P_{VL}$.

Figure 4:
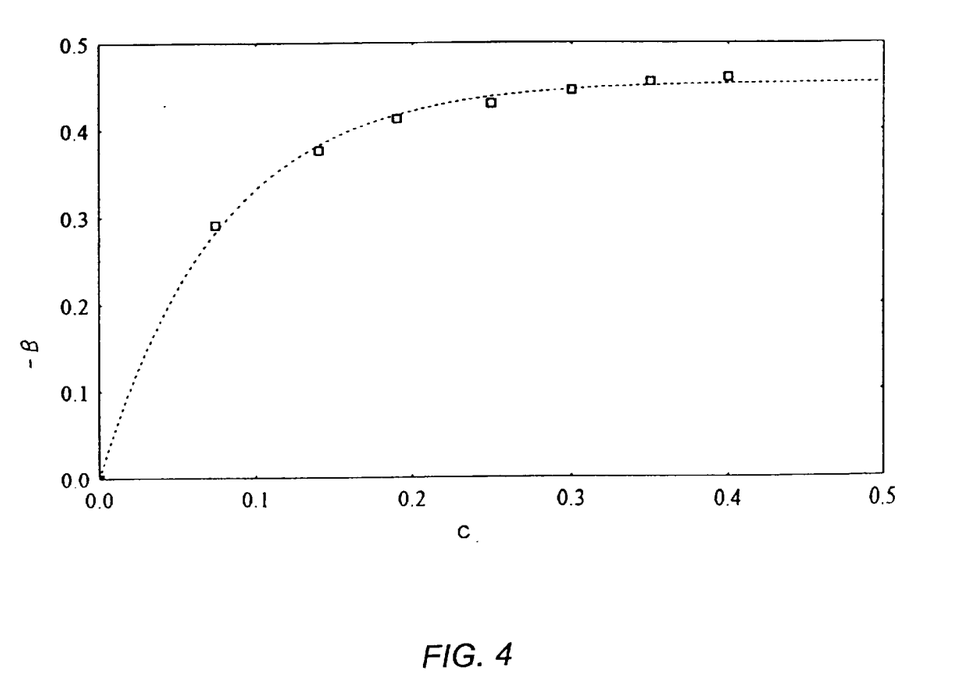
FIG. 4 shows the curve representative of the value of the power correction coefficient as a function of the spherical aberration correction coefficient.
Figure 5:
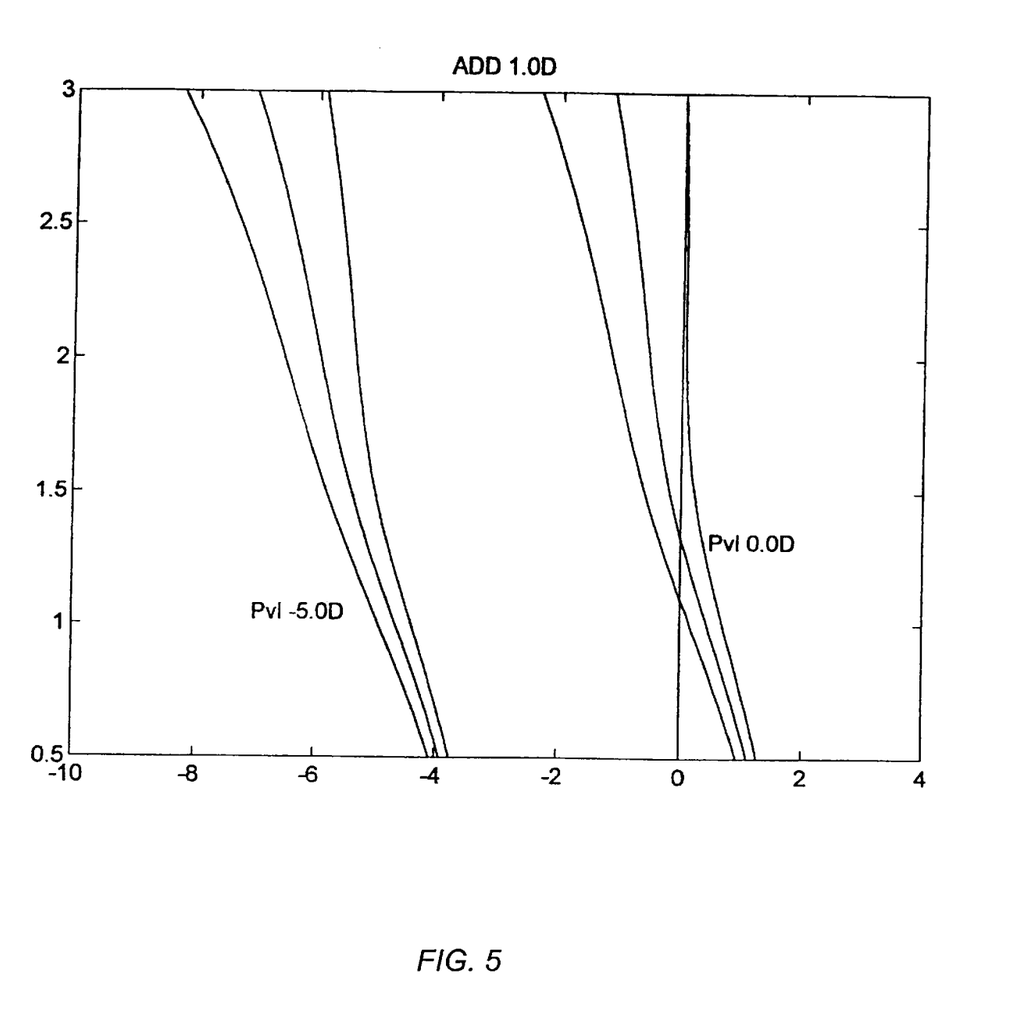
FIGS. 5 through 9 show the lower and upper envelopes of profiles, and nominal profiles, of the power of a progressive multifocal optical lens with spherical aberration correction in the case of a far vision power of $-5$ diopters and 0 diopters for respective additions of 1, 1.5, 2, 2.5 and 3 diopters.
Figure 6:
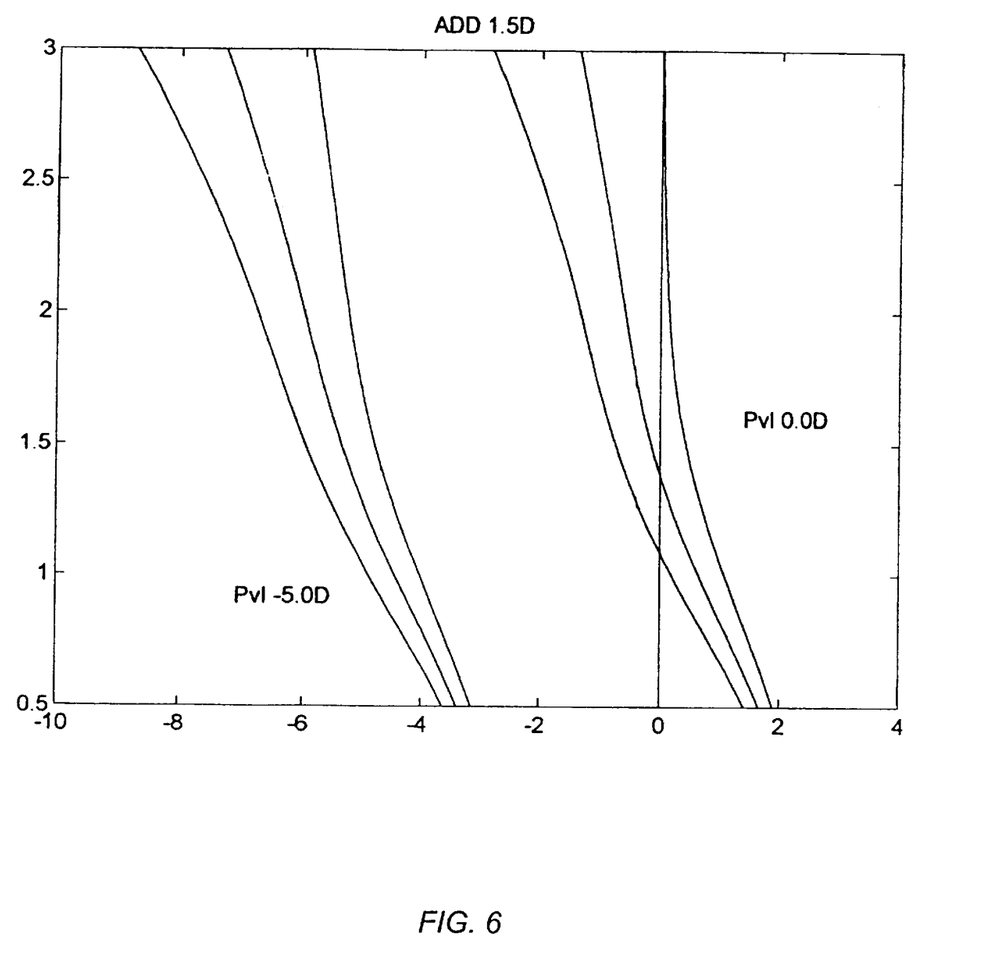
Figure 7:
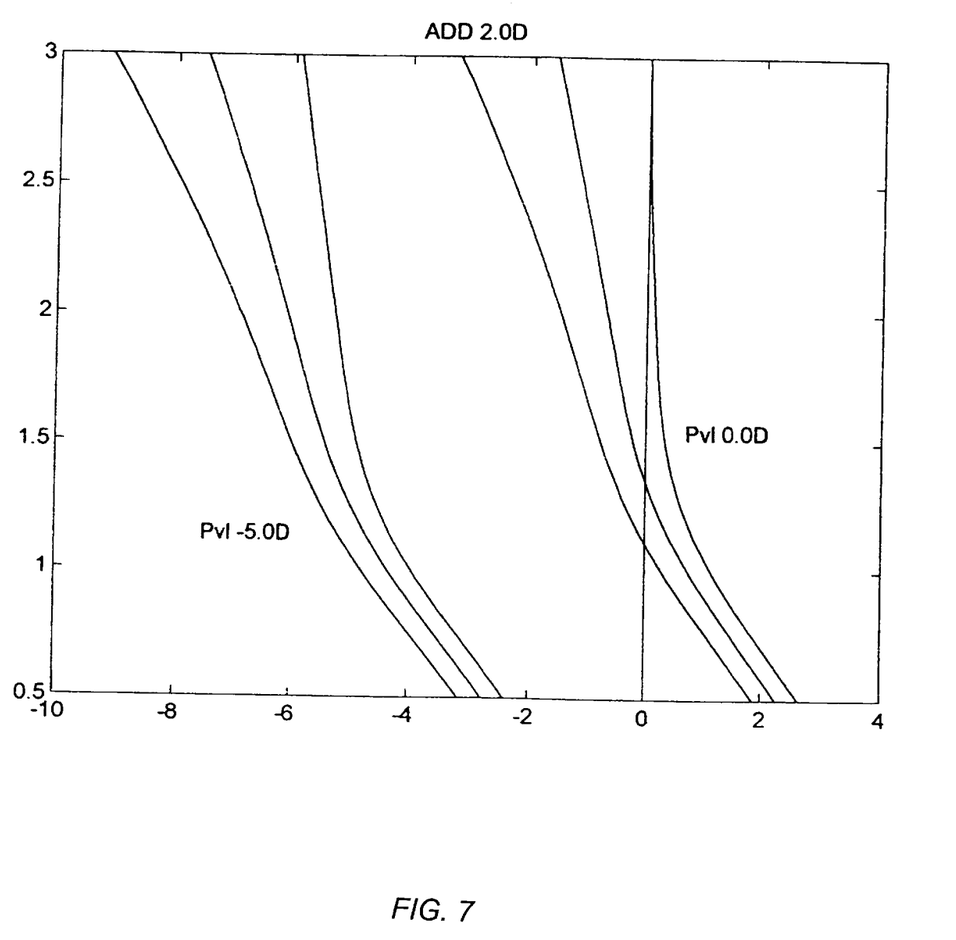
Figure 8:
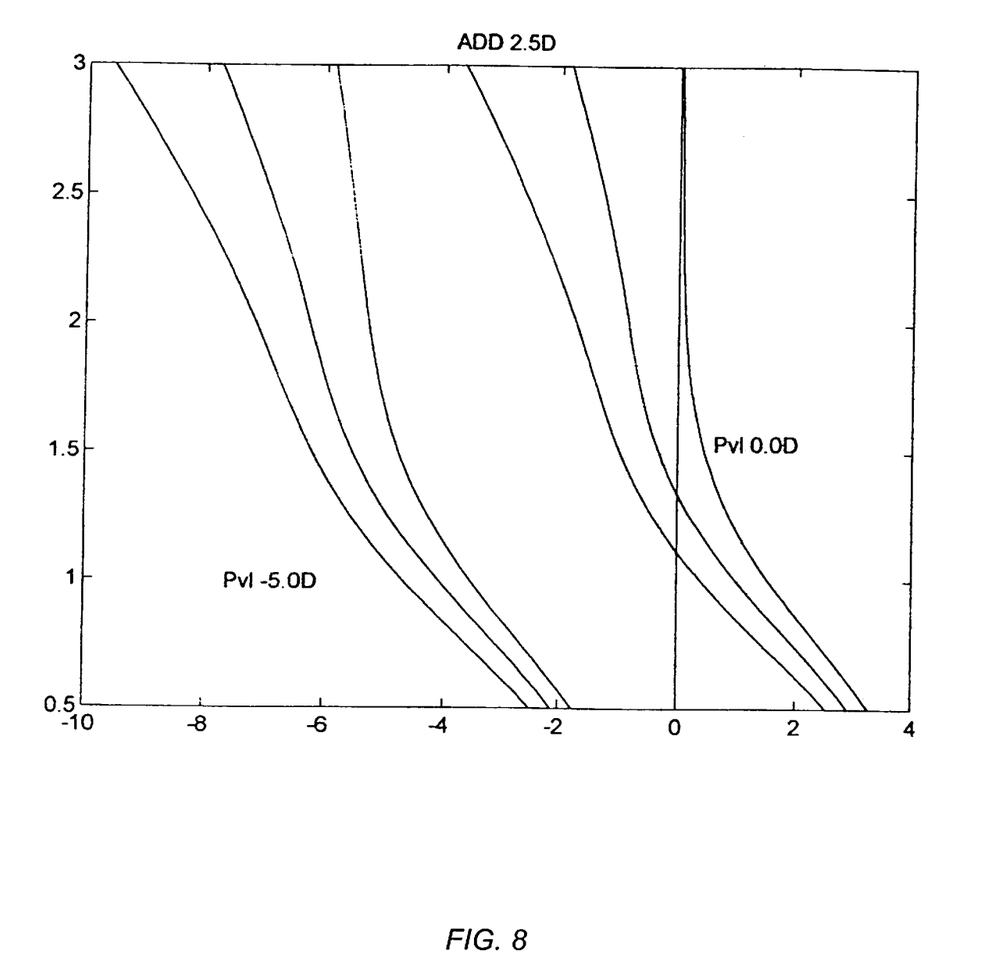
Figure 9:
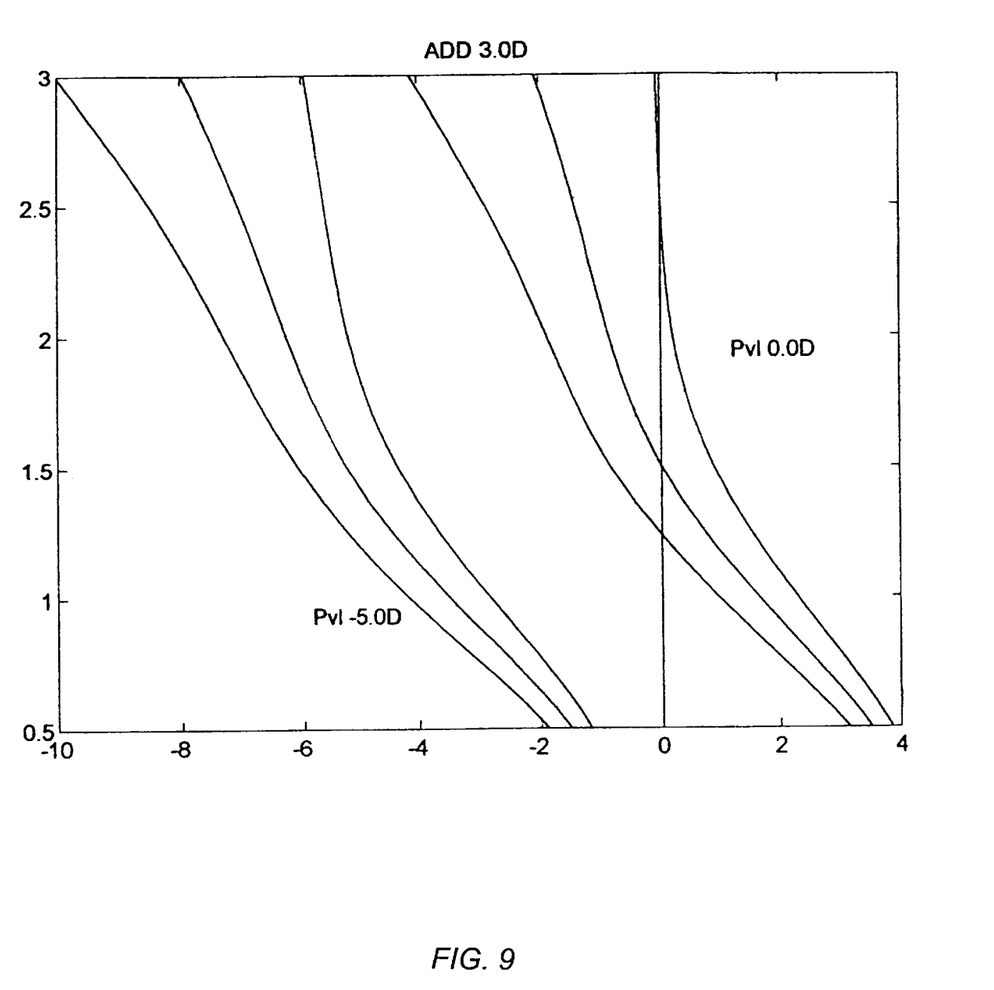

FIG. 4 shows the curve corresponding to that equation, with the spherical aberration correction coefficient C plotted on the horizontal axis against the power correction coefficient B plotted on the vertical axis.

An equation for the power profile of the lens is finally obtained in the following form:

$P(h) = f(P_{VL}, Add, h) + C(Add, P_{VL}) h^2 + B(Add, P_{VL})$

The skilled person will be able to determine the shapes to be imparted to the front face 12 and to the rear face 13 of the lens from the curve of the power profile as a function of the height relative to the axis.

FIGS. 5 through 9 show the lower and upper profile envelopes and the nominal profiles of the power of a progressive multifocal ophthalmic lens with spherical aberration correction (and therefore including the corrective terms described above) for far vision powers of −5 diopters and 0 diopters and for respective additions of 1, 1.5, 2, 2.5 and 3 diopters.

The scope of the present invention is not limited to the details of the embodiments discussed hereinabove by way of example but to the contrary encompasses modifications within the purview of the skilled person. It is clear, for example, that the lens of the invention can be an intraocular implant or an intracorneal lens instead of a contact lens.

TABLE 1

| | Add = 1D | | | |
|---|---|---|---|---|
| A'0 | 1.26386 | A"0 | 1.52644 | A0 | 1.40165 |
| A'2 | −1.18598 | A"2 | −1.09482 | A2 | −1.13539 |
| A'4 | 0.378518 | A"4 | 0.30171 | A4 | 0.337241 |

TABLE 1-continued

| | | | | | |
|---|---|---|---|---|---|
| A'6 | −5.42691 E-02 | A"6 | −2.93378 E-02 | A6 | −0.0427423 |
| A'8 | 2.33828 E-03 | A"8 | −2.07609 E-03 | A8 | 8.29968 E-04 |
| A'10 | 3.15445 E-04 | A"10 | 7.8769 E-04 | A10 | 4.04834 E-04 |
| A'12 | −5.07438 E-05 | A"12 | −8.21244 E-05 | A12 | −5.12825 E-05 |
| A'14 | 3.0475 E-06 | A"14 | 4.31529 E-06 | A14 | 2.83764 E-06 |
| A'16 | −8.76962 E-08 | A"16 | −1.16223 E-07 | A16 | −7.76449 E-08 |
| A'18 | 1.00265 E-09 | A"18 | 1.27688 E-09 | A18 | 8.54866 E-10 |

Add = 1.5D

| | | | | | |
|---|---|---|---|---|---|
| A'0 | 2.00339 | A"0 | 2.27713 | A0 | 2.14261 |
| A'2 | −2.31133 | A"2 | −1.66479 | A2 | −1.99105 |
| A'4 | 1.01658 | A"4 | 0.587462 | A4 | 0.820412 |
| A'6 | −0.240056 | A"6 | −0.121375 | A6 | −0.194111 |
| A'8 | 0.0337422 | A"8 | 0.0159218 | A8 | 0.0288185 |
| A'10 | −2.94537 E-03 | A"10 | −1.35879 E-03 | A10 | −0.00277165 |
| A'12 | 1.60394 E-04 | A"12 | 7.49086 E-05 | A12 | 1.72369 E-04 |
| A'14 | −5.26619 E-06 | A"14 | −2.56358 E-06 | A14 | −6.68299 E-06 |
| A'16 | 9.45037 E-08 | A"16 | 4.93594 E-08 | A16 | 1.46703 E-07 |
| A'18 | −7.02035 E-10 | A"18 | −4.07302 E-10 | A18 | −1.39113 E-09 |

Add = 2D

| | | | | | |
|---|---|---|---|---|---|
| A'0 | 2.70216 | A"0 | 3.44464 | A0 | 3.04879 |
| A'2 | −3.40589 | A"2 | −3.6967 | A2 | −3.4244 |
| A'4 | 1.78475 | A"4 | 1.84759 | A4 | 1.71421 |
| A'6 | −0.519481 | A"6 | −0.518458 | A6 | −0.485038 |
| A'8 | 0.091493 | A"8 | 0.0885806 | A8 | 0.084004 |
| A'10 | −0.0100987 | A"10 | −9.53119 E-03 | A10 | −0.00918407 |
| A'12 | 7.01081 E-04 | A"12 | 6.4772 E-04 | A12 | 6.3438 E-04 |
| A'14 | −2.96764 E-05 | A"14 | −2.69337 E-05 | A14 | −2.67926 E-05 |
| A'16 | 6.98897 E-07 | A"16 | 6.24925 E-07 | A16 | 6.30643 E-07 |
| A'18 | −7.01343 E-09 | A"18 | −6.19319 E-09 | A18 | −6.33178 E-09 |

Add = 2.5D

| | | | | | |
|---|---|---|---|---|---|
| A'0 | 3.65783 | A"0 | 4.15706 | A0 | 3.84715 |
| A'2 | −4.66652 | A"2 | −3.96025 | A2 | −3.95474 |
| A'4 | 2.37082 | A"4 | 1.76854 | A4 | 1.64138 |
| A'6 | −0.658545 | A"6 | −0.460714 | A6 | −0.363149 |
| A'8 | 0.110848 | A"8 | 0.0760187 | A8 | 0.0473992 |
| A'10 | −0.0117773 | A"10 | −0.00812867 | A10 | −0.00378685 |
| A'12 | 7.93256 E-04 | A"12 | 5.586 E-04 | A12 | 1.84073 E-04 |
| A'14 | −3.28028 E-05 | A"14 | −2.37071 E-05 | A14 | −5.15076 E-06 |
| A'16 | 7.58865 E-07 | A"16 | 5.63779 E-07 | A16 | 7.14489 E-08 |
| A'18 | −7.5126 E-09 | A"18 | −5.73387 E-09 | A18 | −3.10284 E-10 |

Add = 3D

| | | | | | |
|---|---|---|---|---|---|
| A'0 | 4.18598 | A"0 | 4.55351 | A0 | 4.36815 |
| A'2 | −4.08044 | A"2 | −2.98119 | A2 | −3.4584 |
| A'4 | 1.58434 | A"4 | 0.86432 | A4 | 1.1305 |
| A'6 | −0.326707 | A"6 | −0.138653 | A6 | −0.19309 |
| A'8 | 0.0389326 | A"8 | 0.0130732 | A8 | 0.0177447 |
| A'10 | −0.00270978 | A"10 | −6.93297 E-04 | A10 | −7.20108 E-04 |
| A'12 | 1.02597 E-04 | A"12 | 1.52301 E-05 | A12 | −1.08962 E-05 |
| A'14 | −1.49759 E-06 | A"14 | 2.83552 E-07 | A14 | 2.33913 E-06 |
| A'16 | −1.82264 E-08 | A"16 | −2.196 E-08 | A16 | −8.82046 E-08 |
| A'18 | 6.18332 E-10 | A"18 | 3.32106 E-10 | A18 | 1.14025 E-09 |

TABLE 2

Add = 1D

| | | | | | |
|---|---|---|---|---|---|
| A'0 | 1.14955 | A"0 | 1.79188 | A0 | 1.3988 |
| A'2 | −2.17834 | A"2 | −2.14906 | A2 | −2.16002 |
| A'4 | 1.44086 | A"4 | 1.26337 | A4 | 1.33772 |
| A'6 | −0.488471 | A"6 | −0.40226 | A6 | −0.432789 |
| A'8 | 0.0952055 | A"8 | 0.0752613 | A8 | 0.0815423 |
| A'10 | −0.0112687 | A"10 | −0.00864155 | A10 | −0.00941029 |
| A'12 | 0.00082252 | A"12 | 0.00061569 | A12 | 6.73638 E-04 |
| A'14 | −3.61421 E-05 | A"14 | −2.65189 E-05 | A14 | −2.91496 E-05 |
| A'16 | 8.76009 E-07 | A"16 | 6.32021 E-07 | A16 | 6.97847 E-07 |
| A'18 | −8.99323 E-09 | A"18 | −6.39553 E-09 | A18 | −709193 E-09 |

TABLE 2-continued

Add = 1.5D

| | | | | | |
|---|---|---|---|---|---|
| A'0 | 1.93369 | A"0 | 2.59533 | A0 | 2.23308 |
| A'2 | −3.67534 | A"2 | −3.36181 | A2 | −3.5289 |
| A'4 | 2.52397 | A"4 | 2.00313 | A4 | 2.21463 |
| A'6 | −0.881948 | A"6 | −0.647982 | A6 | −0.724956 |
| A'8 | 0.176071 | A"8 | 0.123858 | A8 | 0.138094 |
| A'10 | −0.021241 | A"10 | −0.0145608 | A10 | −0.0160961 |
| A'12 | 0.00157429 | A"12 | 0.00106184 | A12 | 1.1625 E-03 |
| A'14 | −7.0039 E-05 | A"14 | −4.67412 E-05 | A14 | −5.06976 E-05 |
| A'16 | 1.71503 E-06 | A"16 | 1.13627 E-06 | A16 | 1.22204 E-06 |
| A'18 | −1.77574 E-08 | A"18 | −1.17047 E-08 | A18 | −1.24938 E-08 |

Add = 2D

| | | | | | |
|---|---|---|---|---|---|
| A'0 | 2.71988 | A"0 | 3.39246 | A0 | 3.09333 |
| A'2 | −4.97264 | A"2 | −4.33763 | A2 | −4.75114 |
| A'4 | 3.29933 | A"4 | 2.42641 | A4 | 2.91364 |
| A'6 | −1.11911 | A"6 | −0.724383 | A6 | −0.937834 |
| A'8 | 2.18396 E-01 | A"8 | 1.27534 E-01 | A8 | 0.17649 |
| A'10 | −2.58999 E-02 | A"10 | −1.38799 E-02 | A10 | −0.0203899 |
| A'12 | 1.89471 E-03 | A"12 | 9.43993 E-04 | A12 | 1.46289 E-03 |
| A'14 | −8.34455 E-05 | A"14 | −3.90499 E-05 | A14 | −6.34757 E-05 |
| A'16 | 2.02699 E-06 | A"16 | 8.98394 E-07 | A16 | 1.52401 E-06 |
| A'18 | −2.0852 E-08 | A"18 | −8.81296 E-09 | A18 | −1.55319 E-08 |

Add = 2.5D

| | | | | | |
|---|---|---|---|---|---|
| A'0 | 3.78586 | A"0 | 4.61931 | A0 | 4.10909 |
| A'2 | −6.68361 | A"2 | −5.52909 | A2 | −5.95027 |
| A'4 | 4.37851 | A"4 | 2.85006 | A4 | 3.46877 |
| A'6 | −1.47553 | A"6 | −7.89562 E-01 | A6 | −1.07452 |
| A'8 | 2.86712 E-01 | A"8 | 1.29997 E-01 | A8 | 0.196608 |
| A'10 | −3.38913 E-02 | A"10 | −1.33166 E-02 | A10 | −0.02225 |
| A'12 | 2.47294 E-03 | A"12 | 8.5695 E-04 | A12 | 1.57197 E-03 |
| A'14 | −1.08683 E-04 | A"14 | −3.36869 E-05 | A14 | −6.74164 E-05 |
| A'16 | 2.63544 E-06 | A"16 | 7.39168 E-07 | A16 | 1.60406 E-06 |
| A'18 | −2.70717 E-08 | A"18 | −6.93743 E-09 | A18 | −1.62318 E-08 |

Add = 3D

| | | | | | |
|---|---|---|---|---|---|
| A'0 | 4.19136 | A"0 | 5.0023 | A0 | 4.60564 |
| A'2 | −6.02347 | A"2 | −4.68276 | A2 | −5.23524 |
| A'4 | 3.41786 | A"4 | 1.78942 | A4 | 2.45824 |
| A'6 | −1.03877 | A"6 | −3.4488 E-01 | A6 | −0.630152 |
| A'8 | 1.8748 E-01 | A"8 | 3.48989 E-02 | A8 | 0.0978757 |
| A'10 | −2.10043 E-02 | A"10 | −1.54767 E-03 | A10 | −0.00961613 |
| A'12 | 1.47276 E-03 | A"12 | −2.11172 E-05 | A12 | 6.01202 E-04 |
| A'14 | −6.27956 E-05 | A"14 | 5.29538 E-06 | A14 | −2.31856 E-05 |
| A'16 | 1.48733 E-06 | A"16 | −2.09482 E-07 | A16 | 5.0277 E-07 |
| A'18 | −1.4996 E-08 | A"18 | 2.80655 E-09 | A18 | −4.68902 E-09 |

TABLE 3

Add = 1D

| | | | | | |
|---|---|---|---|---|---|
| A'0 | 1.07286 | A"0 | 1.67495 | A0 | 1.25812 |
| A'2 | 0.320699 | A"2 | −0.186507 | A2 | 0.276651 |
| A'4 | −0.657171 | A"4 | −0.260694 | A4 | −0.58639 |
| A'6 | 0.255218 | A"6 | 0.109511 | A6 | 0.215821 |
| A'8 | −0.0490516 | A"8 | −0.0201114 | A8 | −0.0389064 |
| A'10 | 0.0054899 | A"10 | 0.00210789 | A10 | 4.06343 E-03 |
| A'12 | −3.74632 E-04 | A"12 | −1.3458 E-04 | A12 | −2.57889 E-04 |
| A'14 | 1.53798 E-05 | A"14 | 5.1918 E-06 | A14 | 9.82156 E-06 |
| A'16 | −3.49417 E-07 | A"16 | −1.11489 E-07 | A16 | −2.06571 E-07 |
| A'18 | 3.37795 E-09 | A"18 | 1.02479 E-09 | A18 | 1.84521 E-09 |

Add = 1.5D

| | | | | | |
|---|---|---|---|---|---|
| A'0 | 1.52699 | A"0 | 2.04694 | A0 | 1.75922 |
| A'2 | −0.361839 | A"2 | 0.00504386 | A2 | −0.13939 |
| A'4 | −0.526959 | A"4 | −0.72156 | A4 | −0.598726 |
| A'6 | 0.311383 | A"6 | 0.332037 | A6 | 0.295587 |
| A'8 | −0.0753019 | A"8 | −0.0712913 | A8 | −0.0653998 |
| A'10 | 0.00997776 | A"10 | 0.00875108 | A10 | 8.16835 E-03 |
| A'12 | −7.79578 E-04 | A"12 | −6.47787 E-04 | A12 | −6.11438 E-04 |

TABLE 3-continued

| | | | | | |
|---|---|---|---|---|---|
| A'14 | 3.58257 E-05 | A"14 | 2.85999 E-05 | A14 | 2.72016 E-05 |
| A'16 | -8.96048 E-07 | A"16 | -6.93668 E-07 | A16 | -6.63346 E-07 |
| A'18 | 9.41343 E-09 | A"18 | 7.11314 E-09 | A18 | 6.82951 E-09 |

Add = 2D

| | | | | | |
|---|---|---|---|---|---|
| A'0 | 2.0372 | A"0 | 2.51543 | A0 | 2.27582 |
| A'2 | -0.773797 | A"2 | -0.0956491 | A2 | -0.311495 |
| A'4 | -0.35122 | A"4 | -0.814048 | A4 | -0.747841 |
| A'6 | 0.260538 | A"6 | 0.391545 | A6 | 0.398884 |
| A'8 | -0.0654291 | A"8 | -0.0867876 | A8 | -0.0920375 |
| A'10 | 0.00874569 | A"10 | 0.0109575 | A10 | 0.0118385 |
| A'12 | -6.83569 E-04 | A"12 | -8.31697 E-04 | A12 | -9.05966 E-04 |
| A'14 | 3.1335 E-05 | A"14 | 3.7539 E-05 | A14 | 4.10027 E-05 |
| A'16 | -7.81015 E-07 | A"16 | -9.28232 E-07 | A16 | -1.01365 E-06 |
| A'18 | 8.17476 E-09 | A"18 | 9.68034 E-09 | A18 | 1.0552 E-08 |

Add = 2.5D

| | | | | | |
|---|---|---|---|---|---|
| A'0 | 2.49526 | A"0 | 2.99351 | A0 | 2.75097 |
| A'2 | -0.982385 | A"2 | -0.486412 | A2 | -0.470951 |
| A'4 | -0.229961 | A"4 | -0.488394 | A4 | -0.632494 |
| A'6 | 0.201655 | A"6 | 0.244189 | A6 | 0.332472 |
| A'8 | -0.0503787 | A"8 | -0.0520116 | A8 | -0.0741809 |
| A'10 | 6.62155 E-03 | A"10 | 6.29987 E-03 | A10 | 9.2779 E-03 |
| A'12 | -5.0929 E-04 | A"12 | -4.6243 E-04 | A12 | -6.94985 E-04 |
| A'14 | 2.30313 E-05 | A"14 | 2.03523 E-05 | A14 | 3.09539 E-05 |
| A'16 | -5.67689 E-07 | A"16 | -4.9403 E-07 | A16 | -7.56087 E-07 |
| A'18 | 5.88796 E-09 | A"18 | 5.08339 E-09 | A18 | 7.79979 E-09 |

Add = 3D

| | | | | | |
|---|---|---|---|---|---|
| A'0 | 3.20898 | A"0 | 3.74531 | A0 | 3.4754 |
| A'2 | -1.11419 | A"2 | -0.699573 | A2 | -0.952351 |
| A'4 | -0.36958 | A"4 | -0.525259 | A4 | -0.349482 |
| A'6 | 0.268856 | A"6 | 0.269972 | A6 | 0.205687 |
| A'8 | -0.0635023 | A"8 | -0.0572078 | A8 | -0.042057 |
| A'10 | 8.02594 E-03 | A"10 | 6.86483 E-03 | A10 | 4.66255 E-03 |
| A'12 | -5.97885 E-04 | A"12 | -4.99263 E-04 | A12 | -3.07085 E-04 |
| A'14 | 2.631 E-05 | A"14 | 2.17955 E-05 | A14 | 1.20246 E-05 |
| A'16 | -6.33313 E-07 | A"16 | -5.2544 E-07 | A16 | -2.59016 E-07 |
| A'18 | 6.43355 E-09 | A"18 | 5.37576 E-09 | A18 | 2.36646 E-09 |

There is claimed:

1. A multifocal ophthalmic lens, wherein the power profile (P) in diopters of the lens as a function of the height (h) in millimeters above the axis (A) of said lens and the addition (Add) in diopters corresponding to the degree of presbyopia and of ametropia of the wearer is defined by an equation of the form:

$$P(h) = f(P_{VL}, Add, h) + C(Add, P_{VL})h^2 + B(Add, P_{VL})$$

in which $P_{VL}$ is the power in diopters required for far vision, $f$ is a function of evolution between the near vision and far vision powers, $C(Add, P_{VL})$ is a spherical aberration correction coefficient in diopters/mm² depending on the addition and on the far vision power and $B(Add, P_{VL})$ is a power correction coefficient depending on the spherical aberration coefficient in diopters.

2. The lens claimed in claim 1 wherein said function $f$ of evolution between near vision and far vision is between lower and upper envelope curves of polynomial form:

$$fmin(P_{VL}, Add, h) = \sum_{i=0}^{9} A'_{2i} h^{2i} + P_{VL}$$

$$fmax(P_{VL}, Add, h) = \sum_{i=0}^{9} A''_{2i} h^{2i} + P_{VL}$$

in which the coefficients $A'_{2i}$ and $A''_{2i}$ are characteristics of the power evolution profile of said lens.

3. The lens claimed in claim 2 wherein said function $f$ of evolution between near vision and far vision is of polynomial form:

$$f(P_{VL}, Add, h) = \sum_{i=0}^{9} A_{2i} h^{2i} + P_{VL}$$

in which the coefficients $A_{2i}$ are characteristics of the power evolution profile of said lens.

4. The lens claimed in claim 2 wherein said coefficients $A'_{2i}$ and $A''_{2i}$ have the following values:

for an addition of 1 diopter:

| | |
|---|---|
| A'₀ = 1.26386 | A"₀ = 1.52644 |
| A'₂ = -1.18598 | A"₂ = -1.09482 |
| A'₄ = 0.378518 | A"₄ = 0.30171 |
| A'₆ = -5.42691 E-02 | A"₆ = -2.93378 E-02 |
| A'₈ = 2.33828 E-03 | A"₈ = -2.07609 E-03 |
| A'₁₀ = 3.15445 E-04 | A"₁₀ = 7.8769 E-04 |
| A'₁₂ = -5.07438 E-05 | A"₁₂ = -8.21244 E-05 |
| A'₁₄ = 3.0475 E-06 | A"₁₄ = 4.31529 E-06 |
| A'₁₆ = -8.76962 E-08 | A"₁₆ = -1.16223 E-07 |
| A'₁₈ = 1.00265 E-09 | A"₁₈ = 1.27688 E-09 | for an addition of 1.5 diopters:

| | |
|---|---|
| A'₀ = 2.00339 | A"₀ = 2.27713 |
| A'₂ = -2.31133 | A"₂ = -1.66479 |
| A'₄ = 1.01658 | A"₄ = 0.587462 |
| A'₆ = -0.240056 | A"₆ = -0.121375 |
| A'₈ = 0.0337422 | A"₈ = 0.0159218 |
| A'₁₀ = -2.94537 E-03 | A"₁₀ = -1.35879 E-03 |
| A'₁₂ = 1.60394 E-04 | A"₁₂ = 7.49086 E-05 |
| A'₁₄ = -5.26619 E-06 | A"₁₄ = -2.56358 E-06 |
| A'₁₆ = 9.45037 E-08 | A"₁₆ = 4.93594 E-08 |
| A'₁₈ = -7.02035 E-10 | A"₁₈ = -4.07302 E-10 | for an addition of 2 diopters:

| | |
|---|---|
| A'₀ = 2.70216 | A"₀ = 3.44464 |
| A'₂ = -3.40589 | A"₂ = -3.6967 |
| A'₄ = 1.78475 | A"₄ = 1.84759 |
| A'₆ = -0.519481 | A"₆ = -0.518458 |
| A'₈ = 0.091493 | A"₈ = 0.0885806 |
| A'₁₀ = -0.0100987 | A"₁₀ = -9.53119 E-03 |
| A'₁₂ = 7.01081 E-04 | A"₁₂ = 6.4772 E-04 |
| A'₁₄ = -2.96764 E-05 | A"₁₄ = -2.69337 E-05 |
| A'₁₆ = 6.98897 E-07 | A"₁₆ = 6.24925 E-07 |
| A'₁₈ = -7.01343 E-09 | A"₁₈ = -6.19319 E-09 | for an addition of 2.5 diopters:

| | |
|---|---|
| $A'_0 = 3.65783$ | $A''_0 = 4.15706$ |
| $A'_2 = -4.66652$ | $A''_2 = -3.96025$ |
| $A'_4 = 2.37082$ | $A''_4 = 1.76854$ |
| $A'_6 = -0.658545$ | $A''_6 = -0.460714$ |
| $A'_8 = 0.110848$ | $A''_8 = 0.0760187$ |
| $A'_{10} = -0.0117773$ | $A''_{10} = -0.00812867$ |
| $A'_{12} = 7.93256\text{ E-04}$ | $A''_{12} = 5.588\text{ E-04}$ |
| $A'_{14} = -3.28028\text{ E-05}$ | $A''_{14} = -2.37071\text{ E-05}$ |
| $A'_{16} = 7.58865\text{ E-07}$ | $A''_{16} = 5.63779\text{ E-07}$ |
| $A'_{18} = -7.5126\text{ E-09}$ | $A''_{18} = -5.73387\text{ E-09}$ | for an addition of 3 diopters:

| | |
|---|---|
| $A'_0 = 4.18598$ | $A''_0 = 4.55351$ |
| $A'_2 = -4.08044$ | $A''_2 = -2.98119$ |
| $A'_4 = 1.58434$ | $A''_4 = 0.86432$ |
| $A'_6 = -0.326707$ | $A''_6 = -0.138653$ |
| $A'_8 = 0.0389326$ | $A''_8 = 0.0130732$ |
| $A'_{10} = -0.00270978$ | $A''_{10} = -0.000693297$ |
| $A'_{12} = 1.02597\text{ E-04}$ | $A''_{12} = 1.52301\text{ E-05}$ |
| $A'_{14} = -1.49759\text{ E-06}$ | $A''_{14} = 2.83552\text{ E-07}$ |
| $A'_{16} = -1.82264\text{ E-08}$ | $A''_{16} = -2.196\text{ E-08}$ |
| $A'_{18} = 6.18332\text{ E-10}$ | $A''_{18} = 3.32106\text{ E-10}$. |

5. The lens claimed in claim 3 wherein said coefficients $A_{2i}$ have the following values:

for an addition of 1 diopter:

| |
|---|
| $A_0 = 1.40165$ |
| $A_2 = -1.13539$ |
| $A_4 = 0.337241$ |
| $A_6 = -0.0427423$ |
| $A_8 = 0.000829968$ |
| $A_{10} = 0.000404834$ |
| $A_{12} = -5.12825\text{ E-05}$ |
| $A_{14} = 2.83764\text{ E-06}$ |
| $A_{16} = -7.76449\text{ E-08}$ |
| $A_{18} = 8.54866\text{ E-10}$ | for an addition of 1.5 diopters:

| |
|---|
| $A_0 = 2.14261$ |
| $A_2 = -1.99105$ |
| $A_4 = 0.820412$ |
| $A_6 = -0.194111$ |
| $A_8 = 0.0288185$ |
| $A_{10} = -0.00277165$ |
| $A_{12} = 1.72369\text{ E-04}$ |
| $A_{14} = -6.68299\text{ E-06}$ |
| $A_{16} = 1.46703\text{ E-07}$ |
| $A_{18} = -1.39113\text{ E-09}$ | for an addition of 2 diopters:

| |
|---|
| $A_0 = 3.04879$ |
| $A_2 = -3.4244$ |
| $A_4 = 1.71421$ |
| $A_6 = -0.485038$ |
| $A_8 = 0.084004$ |
| $A_{10} = -0.00918407$ |
| $A_{12} = 6.3438\text{ E-04}$ |
| $A_{14} = -2.67926\text{ E-05}$ |

-continued

| |
|---|
| $A_{16} = 6.30643\text{ E-07}$ |
| $A_{18} = -6.33178\text{ E-09}$ | for an addition of 2.5 diopters:

| |
|---|
| $A_0 = 3.84715$ |
| $A_2 = -3.95474$ |
| $A_4 = 1.64138$ |
| $A_6 = -0.363149$ |
| $A_8 = 0.0473992$ |
| $A_{10} = -0.00378685$ |
| $A_{12} = 1.84073\text{ E-04}$ |
| $A_{14} = -5.15076\text{ E-06}$ |
| $A_{16} = 7.14489\text{ E-08}$ |
| $A_{18} = -3.10284\text{ E-10}$ | for an addition of 3 diopters:

| |
|---|
| $A_0 = 4.36815$ |
| $A_2 = -3.4584$ |
| $A_4 = 1.1305$ |
| $A_6 = -0.19309$ |
| $A_8 = 0.0177447$ |
| $A_{10} = -7.20108\text{ E-04}$ |
| $A_{12} = -1.08962\text{ E-05}$ |
| $A_{14} = 2.33913\text{ E-06}$ |
| $A_{16} = -8.82046\text{ E-08}$ |
| $A_{18} = 1.14025\text{ E-09}$. |

6. The lens claimed in claim 2 wherein said coefficients $A'_{2i}$ and $A''_{2i}$ have the following values:

for an addition of 1 diopter:

| | |
|---|---|
| $A'_0 = 1.14955$ | $A''_0 = 1.79188$ |
| $A'_2 = -2.17834$ | $A''_2 = -2.14906$ |
| $A'_4 = 1.44086$ | $A''_4 = 1.26337$ |
| $A'_6 = -0.488471$ | $A''_6 = -0.40226$ |
| $A'_8 = 0.0952055$ | $A''_8 = 0.0752613$ |
| $A'_{10} = -0.0112687$ | $A''_{10} = -0.00864155$ |
| $A'_{12} = 0.00082252$ | $A''_{12} = 0.00061569$ |
| $A'_{14} = -3.61421\text{ E-05}$ | $A''_{14} = -2.65189\text{ E-05}$ |
| $A'_{16} = 8.76009\text{ E-07}$ | $A''_{16} = 6.32021\text{ E-07}$ |
| $A'_{18} = -8.99323\text{ E-09}$ | $A''_{18} = -6.39553\text{ E-09}$ | for an addition of 1.5 diopters:

| | |
|---|---|
| $A'_0 = 1.93369$ | $A''_0 = 2.59533$ |
| $A'_2 = -3.67534$ | $A''_2 = -3.36181$ |
| $A'_4 = 2.52397$ | $A''_4 = 2.00313$ |
| $A'_6 = -0.881948$ | $A''_6 = -0.647982$ |
| $A'_8 = 0.176071$ | $A''_8 = 0.123858$ |
| $A'_{10} = -0.021241$ | $A''_{10} = -0.0145608$ |
| $A'_{12} = 0.00157429$ | $A''_{12} = 0.00106184$ |
| $A'_{14} = -7.0039\text{ E-05}$ | $A''_{14} = -4.67412\text{ E-05}$ |
| $A'_{16} = 1.71503\text{ E-06}$ | $A''_{16} = 1.13627\text{ E-06}$ |
| $A'_{18} = -1.77574\text{ E-08}$ | $A''_{18} = -1.17047\text{ E-08}$ | for an addition of 2 diopters:

| | |
|---|---|
| $A'_0 = 2.71988$ | $A''_0 = 3.39246$ |
| $A'_2 = -4.97264$ | $A''_2 = -4.33763$ |
| $A'_4 = 3.29933$ | $A''_4 = 2.42641$ |
| $A'_6 = -1.11911$ | $A''_6 = -0.724383$ |
| $A'_8 = 2.18396\ \text{E-}01$ | $A''_8 = 1.27534\ \text{E-}01$ |
| $A'_{10} = -2.58999\ \text{E-}02$ | $A''_{10} = -1.38799\ \text{E-}02$ |
| $A'_{12} = 1.89471\ \text{E-}03$ | $A''_{12} = 9.43994\ \text{E-}04$ |
| $A'_{14} = -8.34455\ \text{E-}05$ | $A''_{14} = -3.90499\ \text{E-}05$ |
| $A'_{16} = 2.02699\ \text{E-}06$ | $A''_{16} = 8.98394\ \text{E-}07$ |
| $A'_{18} = -2.0852\ \text{E-}08$ | $A''_{18} = -8.81296\ \text{E-}09$ | for an addition of 2.5 diopters:

| | |
|---|---|
| $A'_0 = 3.78586$ | $A''_0 = 4.61931$ |
| $A'_2 = -6.68361$ | $A''_2 = -5.52909$ |
| $A'_4 = 4.37851$ | $A''_4 = 2.85006$ |
| $A'_6 = -1.47553$ | $A''_6 = -7.89562\ \text{E-}01$ |
| $A'_8 = 2.86712\ \text{E-}01$ | $A''_8 = 1.29997\ \text{E-}01$ |
| $A'_{10} = -3.38913\ \text{E-}02$ | $A''_{10} = -1.33166\ \text{E-}02$ |
| $A'_{12} = 2.47294\ \text{E-}03$ | $A''_{12} = 8.5695\ \text{E-}04$ |
| $A'_{14} = -1.08683\ \text{E-}04$ | $A''_{14} = -3.36869\ \text{E-}05$ |
| $A'_{16} = 2.63544\ \text{E-}06$ | $A''_{16} = 7.39168\ \text{E-}07$ |
| $A'_{18} = -2.70717\ \text{E-}08$ | $A''_{18} = -6.93743\ \text{E-}09$ | for an addition of 3 diopters:

| | |
|---|---|
| $A'_0 = 4.19136$ | $A''_0 = 5.0023$ |
| $A'_2 = -6.02347$ | $A''_2 = -4.68276$ |
| $A'_4 = 3.41786$ | $A''_4 = 1.78942$ |
| $A'_6 = -1.03877$ | $A''_6 = -3.4488\ \text{E-}01$ |
| $A'_8 = 1.8748\ \text{E-}01$ | $A''_8 = 3.48989\ \text{E-}02$ |
| $A'_{10} = -2.10043\ \text{E-}02$ | $A''_{10} = -1.54767\ \text{E-}03$ |
| $A'_{12} = 1.47276\ \text{E-}03$ | $A''_{12} = -2.11172\ \text{E-}05$ |
| $A'_{14} = -6.27956\ \text{E-}05$ | $A''_{14} = 5.29538\ \text{E-}06$ |
| $A'_{16} = 1.48733\ \text{E-}06$ | $A''_{16} = -2.09482\ \text{E-}07$ |
| $A'_{18} = -1.4996\ \text{E-}08$ | $A''_{18} = 2.80655\ \text{E-}09$. |

7. The lens claimed in claim 3 wherein said coefficients $A_{2i}$ have the following values:

for an addition of 1 diopter:

| |
|---|
| $A_0 = 1.3988$ |
| $A_2 = -2.16002$ |
| $A_4 = 1.33772$ |
| $A_6 = -0.432789$ |
| $A_8 = 0.0815423$ |
| $A_{10} = -0.00941029$ |
| $A_{12} = 6.73638\ \text{E-}04$ |
| $A_{14} = -2.91496\ \text{E-}05$ |
| $A_{16} = 6.97847\ \text{E-}07$ |
| $A_{18} = -7.09193\ \text{E-}09$ | for an addition of 1.5 diopters:

| |
|---|
| $A_0 = 2.23308$ |
| $A_2 = -3.5289$ |
| $A_4 = 2.21463$ |
| $A_6 = -0.724956$ |
| $A_8 = 0.138094$ |
| $A_{10} = -0.0160961$ |
| $A_{12} = 1.1625\ \text{E-}03$ |
| $A_{14} = -5.06976\ \text{E-}05$ |

| |
|---|
| $A_{16} = 1.22204\ \text{E-}06$ |
| $A_{18} = -1.24938\ \text{E-}08$ | for an addition of 2 diopters:

| |
|---|
| $A_0 = 3.09333$ |
| $A_2 = -4.75114$ |
| $A_4 = 2.91364$ |
| $A_6 = -0.937834$ |
| $A_8 = 0.17649$ |
| $A_{10} = -0.0203899$ |
| $A_{12} = 1.46289\ \text{E-}03$ |
| $A_{14} = -6.34757\ \text{E-}05$ |
| $A_{16} = 1.52401\ \text{E-}06$ |
| $A_{18} = -1.55319\ \text{E-}08$ | for an addition of 2.5 diopters:

| |
|---|
| $A_0 = 4.10909$ |
| $A_2 = -5.95027$ |
| $A_4 = 3.46877$ |
| $A_6 = -1.07452$ |
| $A_8 = 0.196608$ |
| $A_{10} = -0.02225$ |
| $A_{12} = 1.57197\ \text{E-}03$ |
| $A_{14} = -6.74164\ \text{E-}05$ |
| $A_{16} = 1.60406\ \text{E-}06$ |
| $A_{18} = -1.62318\ \text{E-}08$ | for an addition of 3 diopters:

| |
|---|
| $A_0 = 4.60564$ |
| $A_2 = -5.23524$ |
| $A_4 = 2.45824$ |
| $A_6 = -0.630152$ |
| $A_8 = 0.0978757$ |
| $A_{10} = -0.00961613$ |
| $A_{12} = 6.01202\ \text{E-}04$ |
| $A_{14} = -2.31856\ \text{E-}05$ |
| $A_{16} = 5.0277\ \text{E-}07$ |
| $A_{18} = -4.68902\ \text{E-}09$. |

8. The lens claimed in claim 2 wherein said coefficients $A'_{2i}$ and $A''_{2i}$ have the following values:

for an addition of 1 diopter:

| | |
|---|---|
| $A'_0 = 1.07286$ | $A''_0 = 1.67495$ |
| $A'_2 = 0.320699$ | $A''_2 = -0.186507$ |
| $A'_4 = -0.657171$ | $A''_4 = -0.260694$ |
| $A'_6 = 0.255218$ | $A''_6 = 0.109511$ |
| $A'_8 = -0.0490516$ | $A''_8 = -0.0201114$ |
| $A'_{10} = 0.0054899$ | $A''_{10} = 0.00210789$ |
| $A'_{12} = -3.74632\ \text{E-}04$ | $A''_{12} = -1.3458\ \text{E-}04$ |
| $A'_{14} = 1.53798\ \text{E-}05$ | $A''_{14} = 5.1918\ \text{E-}06$ |
| $A'_{16} = -3.49417\ \text{E-}07$ | $A''_{16} = -1.11489\ \text{E-}07$ |
| $A'_{10} = 3.37795\ \text{E-}09$ | $A''_{18} = 1.02479\ \text{E-}09$ | for an addition of 1.5 diopters:

| | |
|---|---|
| $A'_0 = 1.52699$ | $A''_0 = 2.04694$ |
| $A'_2 = -0.361839$ | $A''_2 = 0.00504386$ |
| $A'_4 = -0.526959$ | $A''_4 = -0.72156$ |
| $A'_6 = 0.311383$ | $A''_6 = 0.332037$ |
| $A'_8 = -0.0753019$ | $A''_8 = -0.0712913$ |
| $A'_{10} = 0.00997776$ | $A''_{10} = 0.00875106$ |
| $A'_{12} = -7.79578\ E-04$ | $A''_{12} = -6.47787\ E-04$ |
| $A'_{14} = 3.58257\ E-05$ | $A''_{14} = 2.85999\ E-05$ |
| $A'_{16} = -8.96048\ E-07$ | $A''_{16} = -6.93668\ E-07$ |
| $A'_{18} = 9.41343\ E-09$ | $A''_{18} = 7.11314\ E-09$ | for an addition of 2 diopters:

| | |
|---|---|
| $A'_0 = 2.0372$ | $A''_0 = 2.51543$ |
| $A'_2 = -0.773797$ | $A''_2 = -0.0956491$ |
| $A'_4 = -0.35122$ | $A''_4 = -0814045$ |
| $A'_6 = 0.260538$ | $A''_6 = 0.391545$ |
| $A'_8 = -0.0654291$ | $A''_8 = -0.0867876$ |
| $A'_{10} = 0.00874569$ | $A''_{10} = 0.0109575$ |
| $A'_{12} = -6.83569\ E-04$ | $A''_{12} = -8.31697\ E-04$ |
| $A'_{14} = 3.1335\ E-05$ | $A''_{14} = 3.7539\ E-05$ |
| $A'_{16} = -7.81015\ E-07$ | $A''_{16} = -9.28232\ E-07$ |
| $A'_{18} = 8.17476\ E-09$ | $A''_{18} = 9.68034\ E-09$ | for an addition of 2.5 diopters:

| | |
|---|---|
| $A'_0 = 2.49526$ | $A''_0 = 2.99351$ |
| $A'_2 = -0.982385$ | $A''_2 = -0.486412$ |
| $A'_4 = -0.229961$ | $A''_4 = -0.488394$ |
| $A'_6 = 0.201655$ | $A''_6 = 0.244189$ |
| $A'_8 = -0.0503787$ | $A''_8 = -0.0520116$ |
| $A'_{10} = 6.62155\ E-03$ | $A''_{10} = 6.29987\ E-03$ |
| $A'_{12} = -5.0929\ E-04$ | $A''_{12} = -4.6243\ E-04$ |
| $A'_{14} = 2.30313\ E-05$ | $A''_{14} = 2.03523\ E-05$ |
| $A'_{16} = -5.67689\ E-07$ | $A''_{16} = -4.9403\ E-07$ |
| $A'_{18} = 5.88796\ E-09$ | $A''_{18} = 5.08339\ E-09$ | for an addition of 3 diopters:

| | |
|---|---|
| $A'_0 = 3.20898$ | $A''_0 = 3.74531$ |
| $A'_2 = -1.11419$ | $A''_2 = -0.699573$ |
| $A'_4 = -0.36958$ | $A''_4 = -0.525259$ |
| $A'_6 = 0.268856$ | $A''_6 = 0.269972$ |
| $A'_8 = -0.0635023$ | $A''_8 = -0.0572078$ |
| $A'_{10} = 8.02594\ E-03$ | $A''_{10} = 6.86483\ E-03$ |
| $A'_{12} = -5.97885\ E-04$ | $A''_{12} = -4.99263\ E-04$ |
| $A'_{14} = 2.631\ E-05$ | $A''_{14} = 2.17955\ E-05$ |
| $A'_{16} = -6.33313\ E-07$ | $A''_{16} = -5.2544\ E-07$ |
| $A'_{18} = 6.43355\ E-09$ | $A''_{18} = 5.37576\ E-09$ |

9. The lens claimed in claim 3 wherein said coefficients $A_{2i}$ have the following values:

for an addition of 1 diopter:

| |
|---|
| $A_0 = 1.25812$ |
| $A_2 = 0.276651$ |
| $A_4 = -0.58639$ |
| $A_6 = 0.215821$ |
| $A_8 = -0.0389064$ |
| $A_{10} = 4.06343\ E-03$ |
| $A_{12} = -2.57889\ E-04$ |
| $A_{14} = 9.82156\ E-06$ |
| $A_{16} = -2.06571\ E-07$ |
| $A_{18} = 1.84521\ E-09$ | for an addition of 1.5 diopters:

| |
|---|
| $A_0 = 1.75922$ |
| $A_2 = -0.13939$ |
| $A_4 = -0.598726$ |
| $A_6 = 0.2945587$ |
| $A_8 = -0.0653998$ |
| $A_{10} = 8.16835\ E-03$ |
| $A_{12} = -6.11438\ E-04$ |
| $A_{14} = 2.72016\ E-05$ |
| $A_{16} = -6.63346\ E-07$ |
| $A_{18} = 6.82951\ E-09$ | for an addition of 2 diopters:

| |
|---|
| $A_0 = 2.27582$ |
| $A_2 = -0.311495$ |
| $A_4 = -0.747841$ |
| $A_6 = 0.398884$ |
| $A_8 = -0.0920375$ |
| $A_{10} = 0.0118385$ |
| $A_{12} = -9.05966\ E-04$ |
| $A_{14} = 4.10027\ E-05$ |
| $A_{16} = -1.01365\ E-06$ |
| $A_{18} = 1.0552\ E-08$ | for an addition of 2.5 diopters:

| |
|---|
| $A_0 = 2.75097$ |
| $A_2 = -0.470951$ |
| $A_4 = -0.632494$ |
| $A_6 = 0.332472$ |
| $A_8 = -0.0741809$ |
| $A_{10} = 9.2779\ E-03$ |
| $A_{12} = -6.94985\ E-04$ |
| $A_{14} = 3.09539\ E-05$ |
| $A_{16} = -7.56087\ E-07$ |
| $A_{18} = 7.79979\ E-09$ | for an addition of 3 diopters:

| |
|---|
| $A_0 = 3.4754$ |
| $A_2 = -0.952351$ |
| $A_4 = -0.349482$ |
| $A_6 = 0.205687$ |
| $A_8 = -0.042057$ |
| $A_{10} = 4.66255\ E-03$ |
| $A_{12} = -3.07085\ E-04$ |
| $A_{14} = 1.20246\ E-05$ |
| $A_{16} = -2.59016\ E-07$ |
| $A_{18} = 2.36646\ E-09$. |

10. The lens claimed in claim 1 wherein said function $\underline{f}$ of evolution between near vision and far vision is of discontinuous form with at least two segments as a function of $\underline{h}$:

$f(P_{VL}, Add, h) = P_{VL} + Add$ for $\underline{h} \leq R$ and $f(P_{VL}, Add, h) = P_{VL}$ for $\underline{h} > R$ where R is an internal area radius of said lens depending on the addition.

11. The lens claimed in claim 10 wherein said radius R has substantially the following values as a function of the addition (Add) expressed in diopters:

| | |
|---|---|
| for Add = 0.5 | R = 1.39 ± 0.15 |
| for Add = 0.75 | R = 1.35 ± 0.15 |
| for Add = 1 | R = 1.32 ± 0.15 |
| for Add = 1.25 | R = 1.29 ± 0.15 |
| for Add = 1.5 | R = 1.27 ± 0.15 |
| for Add = 1.75 | R = 1.245 ± 0.15 |
| for Add = 2 | R = 1.225 ± 0.15 |
| for Add = 2.25 | R = 1.2 ± 0.15 |
| for Add = 2.5 | R = 1.17 ± 0.15 |
| for Add = 2.75 | R = 1.12 ± 0.15 |
| for Add = 3 | R = 1.06 ± 0.15 | and for the other values of said addition (Add) said radius R is obtained by interpolation or extrapolation.

12. The lens claimed in claim 1 wherein said coefficient C is within an area defined by the following lower and upper curves:

$$Cmin(Add, P_{VL}) = -0.098\, Add + 0.02\, P_{VL} - 0.15$$

$$Cmax(Add, P_{VL}) = -0.0047\, Add + 0.02\, P_{VL} - 0.0065$$

where $P_{VL}$ is in the range −20 diopters to +20 diopters and Add is in the range 0.50 diopters to 4 diopters.

13. The lens claimed in claim 1 wherein said coefficient C is substantially defined by the following equation:

$$C(Add, P_{VL}) = -0.051\, Add + 0.02\, P_{VL} - 0.077.$$

14. The lens claimed in claim 1 wherein said power correction coefficient (B) is expressed as a function of the spherical aberration correction coefficient (C) substantially by the following equation:

When $C \neq 0$, $$B(Add, P_{VL}) = -0.46 \cdot \frac{C(Add, P_{VL})}{|C(Add, P_{VL})|} [1 - \exp(-13.1 \cdot |C(Add, P_{VL})|)]$$

when $C = 0$, $B(Add, P_{VL}) = 0$.

* * * * *